US011196757B2

(12) United States Patent
Rodniansky et al.

(10) Patent No.: US 11,196,757 B2
(45) Date of Patent: Dec. 7, 2021

(54) SUSPENDING SECURITY VIOLATING-DATABASE CLIENT CONNECTIONS IN A DATABASE PROTECTION SYSTEM

(71) Applicant: International Business Machines Corporation, Armonk, NY (US)

(72) Inventors: Leonid Rodniansky, Allston, MA (US); Tania Butovsky, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/546,338

(22) Filed: Aug. 21, 2019

(65) Prior Publication Data

US 2021/0058407 A1 Feb. 25, 2021

(51) Int. Cl.
*H04L 29/06* (2006.01)
*G06F 21/62* (2013.01)

(52) U.S. Cl.
CPC ...... *H04L 63/1416* (2013.01); *G06F 21/6218* (2013.01)

(58) Field of Classification Search
None
See application file for complete search history.

(56) References Cited

U.S. PATENT DOCUMENTS 7,444,331 B1 * 10/2008 Nachenberg ........ G06F 16/2455
7,958,159 B1 * 6/2011 Tran .................. G06F 16/24564
707/802
7,984,500 B1 * 7/2011 Khanna .................... G06F 21/60
726/22
8,046,374 B1 * 10/2011 Bromwich ............ G06F 21/552
707/759
8,261,326 B2 9/2012 Ben-Natan
2005/0071643 A1 * 3/2005 Moghe .................. G06F 21/552
713/182
2012/0210158 A1 * 8/2012 Akiyama ................ G06F 11/07
714/2
2015/0242531 A1 8/2015 Rodniansky
2017/0078324 A1 * 3/2017 Bordawekar ....... H04L 63/1408
(Continued)

*Primary Examiner* — Joseph P Hirl
*Assistant Examiner* — Hassan Saadoun
(74) *Attorney, Agent, or Firm* — Jeffrey S. LaBaw; David H. Judson

(57) ABSTRACT

A database protection system (DPS) is augmented to enable efficient handling of security-violating database client connections. To this end, when the DPS determines to suspend a suspect database client connection several actions are taken. The DPS drops the request and sends a database protocol-specific message to the database server; upon receiving an acknowledgment, the DPS closes the associated transport layer connection mechanism The DPS then initiates an interaction with the client, preferably an exchange of periodic messages (e.g., keep-alive messages) configured to maintain the client in a suspended state. While in this state, the client does not detect any problem with the application or the connection and thus does not try to reconnect to the database server. The DPS then performs an additional assessment/investigation of the violation even as the connection remains open, but suspended. Further action is then taken depending on the results of this evaluation.

21 Claims, 4 Drawing Sheets

(56) References Cited

U.S. PATENT DOCUMENTS

| | | |
|---|---|---|
| 2018/0234460 A1 | 8/2018 | Smith et al. |
| 2018/0268136 A1* | 9/2018 | Ng .................... G06F 16/2425 |
| 2019/0005252 A1 | 1/2019 | Yun |
| 2019/0058730 A1 | 2/2019 | Fu et al. |

* cited by examiner

SUSPENDING SECURITY VIOLATING-DATABASE CLIENT CONNECTIONS IN A DATABASE PROTECTION SYSTEM

BACKGROUND OF THE INVENTION

Technical Field

This disclosure relates generally to securing resources in a distributed computing environment and, in particular, to database access security.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

A multi-tier architecture of this type may include or be associated with a database protection solution/system (DPS). Systems of this type analyze database access by a client application, typically by monitoring a network or local access to the database server, thereby enabling monitoring of transactions to identify suspicious behavior. In a typical solution, an agent (which may be a proxy, or other monitoring functionality) operates to monitor both requests (to the server) and responses (from the server). The requests and responses are forwarded to a security mechanism, which typically includes various components, such as a protocol analyzer module, a statements/commands parser, a policy validation module, and an alert module. The security mechanism is configured to examine the requests and the responses. In particular, a database query that is sent by the database client application to the database server is extracted from the database protocol packets intercepted by the agent; the security mechanism then parses this query up to a database object level, validates the query against one or more security policies for a potential database object access violation, and issues an appropriate alert if an access violation is detected. The system may also suspend database client connection(s) when a security anomaly or violation is detected. A commercial product that provides this type of database access control system functionality is IBM® Guardium®.

Known DPS mechanisms include logic to terminate a database connection when a security anomaly/violation is identified. Typically, the standard way to terminate the client connection is to close it at the transport layer, e.g., closing a socket or pipe, detaching a shared memory segment, or the like. When this occurs, however, the client side of the database connection sees a communication error. In the usual case, and if the application responds to communication error exceptions of this type, the client application attempts to reconnect (or reconnects) to the database server, thereby creating additional communication and processing overhead on the system. Terminating the database connection in this manner (by sending a database-specific error response to the client) also interferes with the expected request-response semantics, as the database client normally is waiting for a response to its previous request (the one that the security mechanism has found to be suspicious). When (as in this scenario) the response does not relate to the request, then the application layer also attempts to handle such exception and, as a result also tries to restores the connection (by reconnecting).

Thus, there remains a need to provide an improved way of handling security-violating database client connections in a database protection solution. The technique of this disclosure addresses this need.

BRIEF SUMMARY

A database protection system (DPS) is augmented according to this disclosure to provide additional functionality to enable efficient management and handling of security-violating database client connections. To this end, when the DPS determines to suspend a suspect database client connection (e.g., because a security anomaly or violation has been identified), preferably several actions are taken. First, the DPS drops the request and sends a database protocol-specific message (e.g., a "close" message) to the database server; upon receiving an acknowledgment, the DPS closes the associated transport layer connection mechanism (e.g., the database server socket). The DPS then initiates an interaction with the database client and, in particular, the exchange of periodic messages (e.g., keep-alive messages) that are configured to maintain the database client in what is in effect a suspended state. While in this operating state, the database client does not detect any problem with the application or the connection and thus does not try to reconnect to the database server. The DPS then performs an additional assessment/investigation of the security violation even as the connection remains open, but suspended. Further action is then taken depending on the results of this evaluation.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
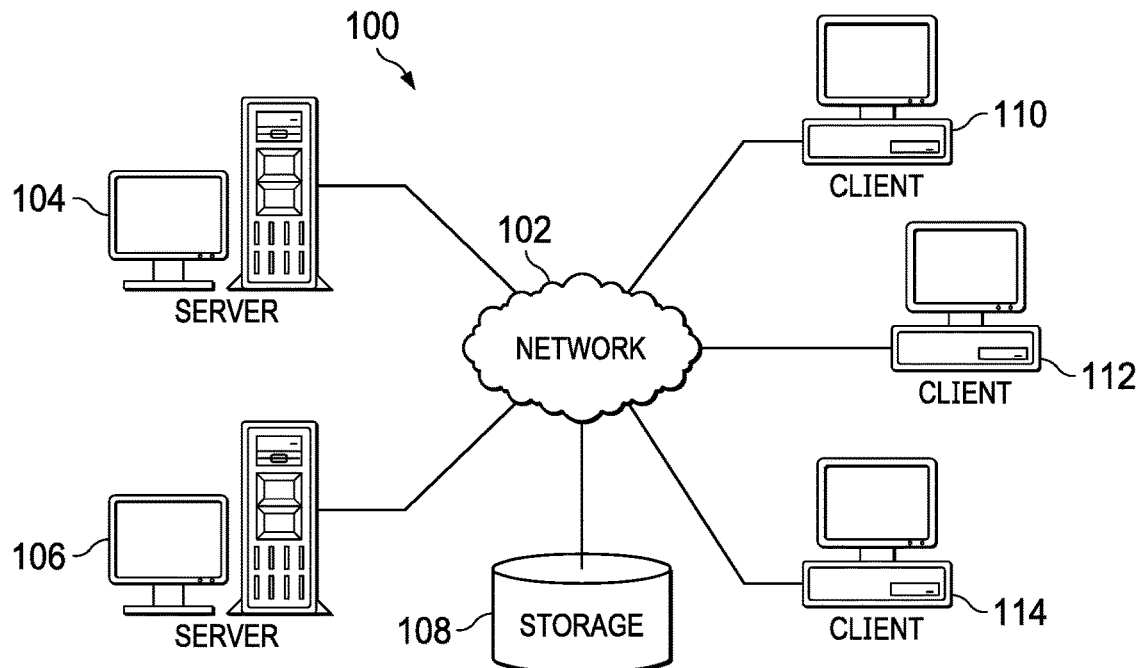
FIG. 1 depicts an exemplary block diagram of a distributed data processing environment in which exemplary aspects of the illustrative embodiments may be implemented.
Figure 2:
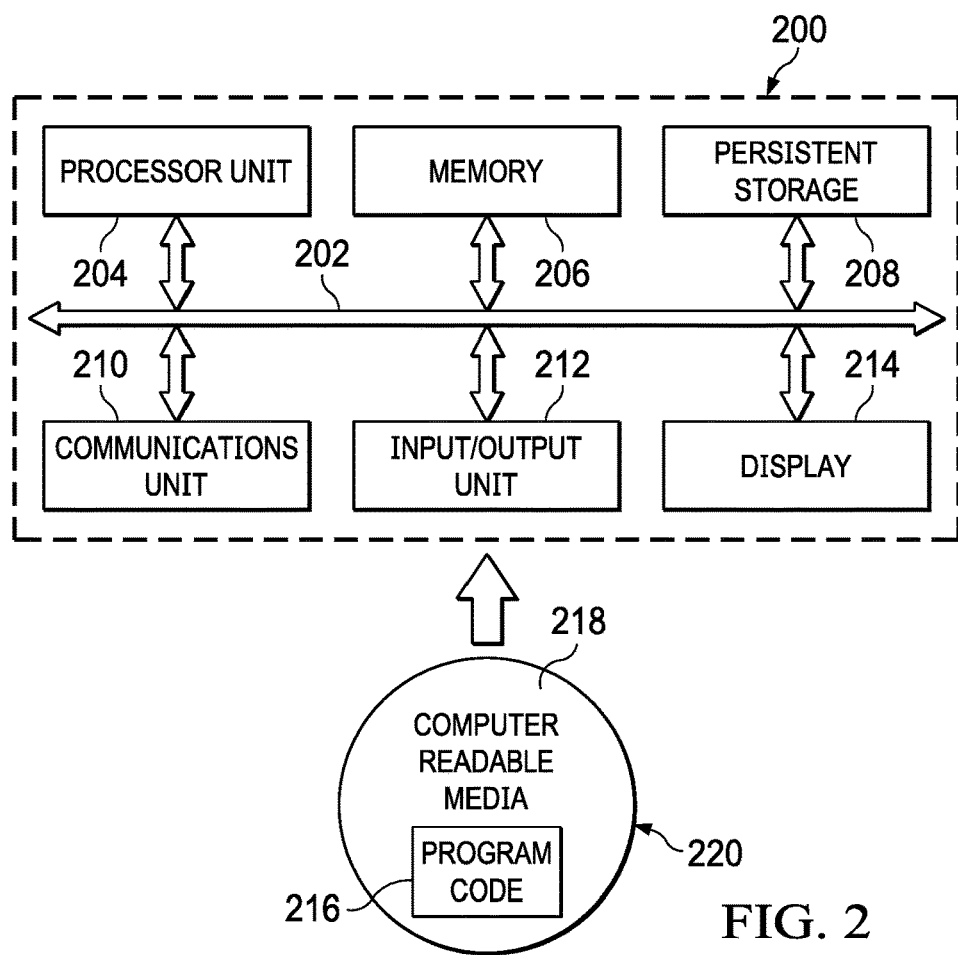
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
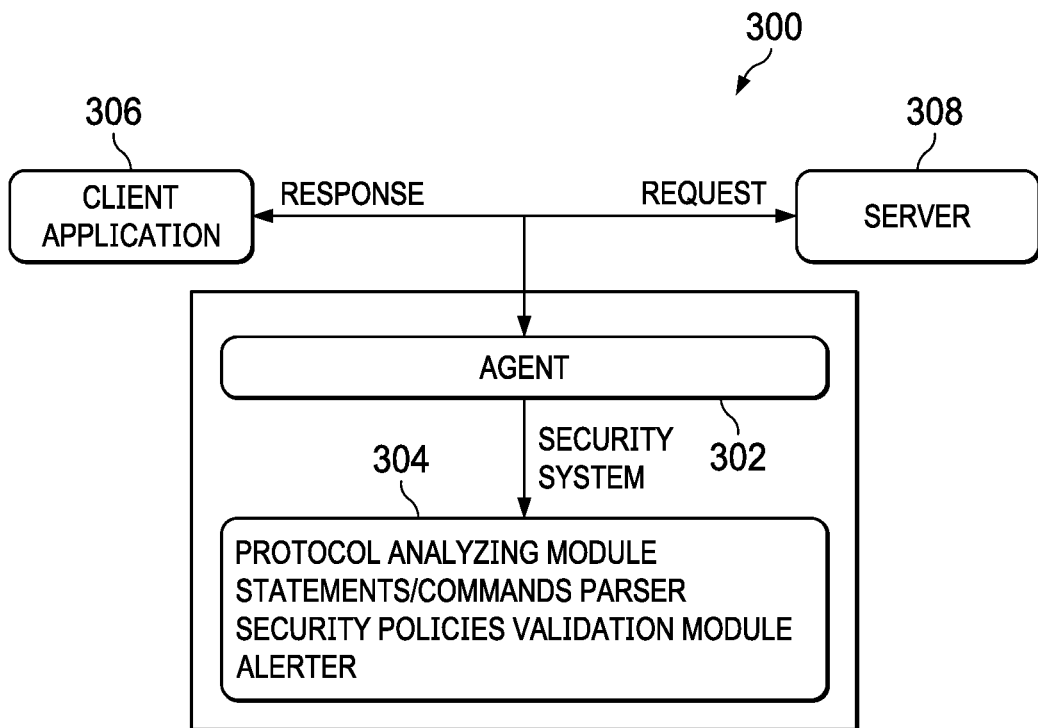
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
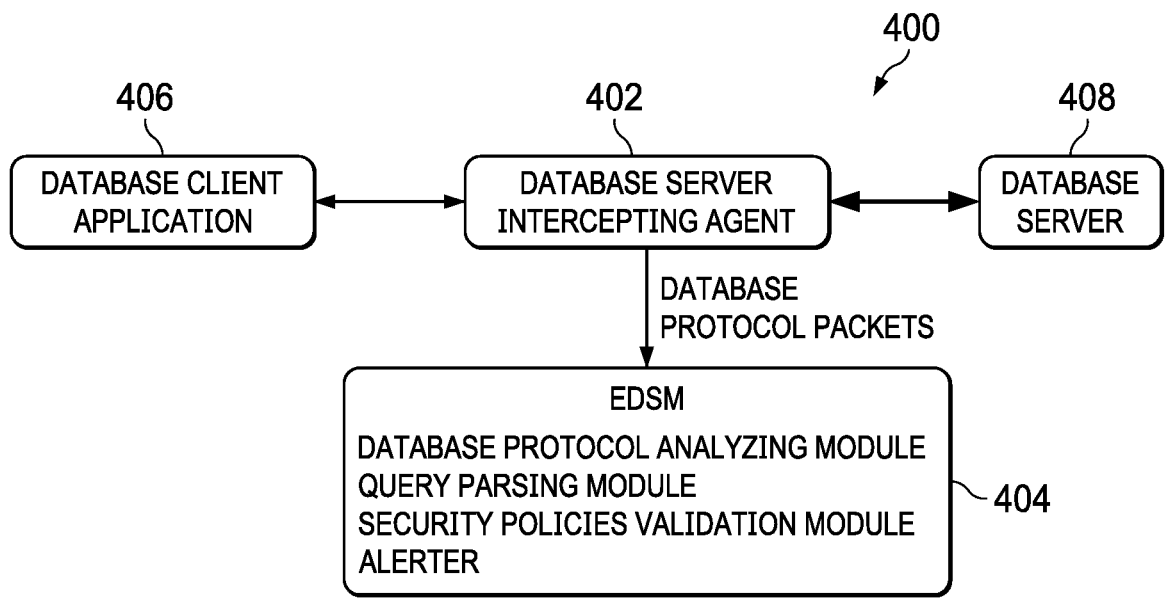
FIG. 4 depicts an access control system (e.g., for a database) that is structured with a security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server. As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Figure 5:
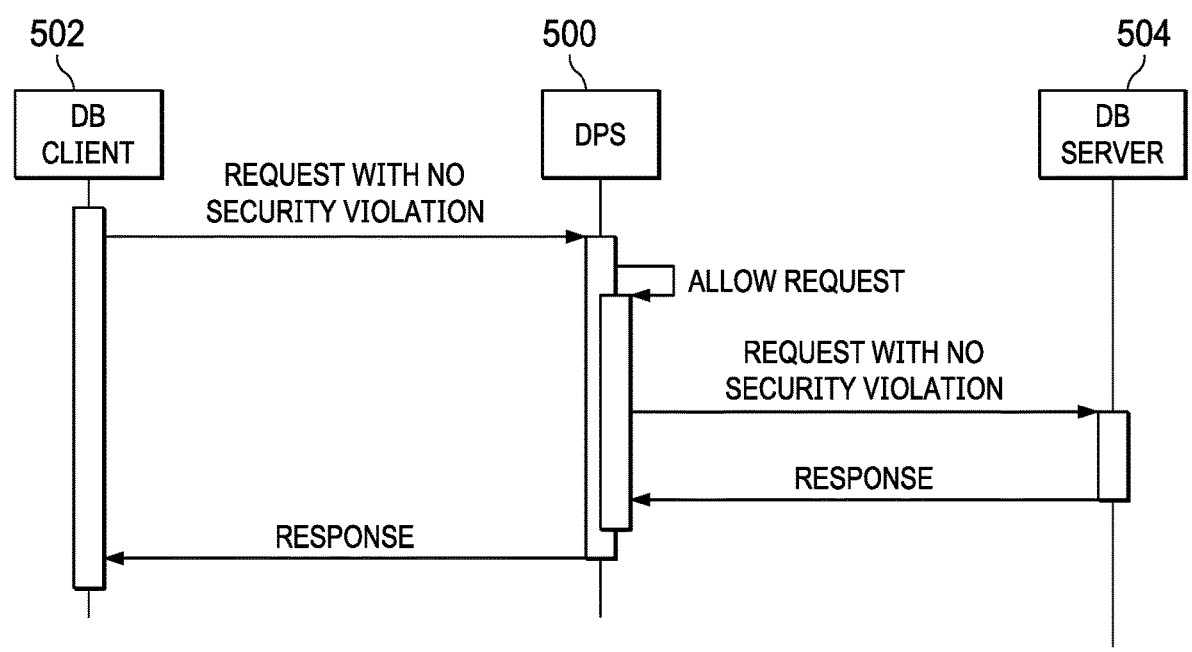
FIG. 5 depicts an operation of a DPS that does not detect a security violation.

FIG. 5 depicts a representative operation of a database protection solution/system (DPS) when a database request does not involve a security violation. It should be appreciated that the nomenclature "security violation" is not intended to be limiting. The DPS may be configured to identify an actual violation (e.g., of some configured security policy), or the DPS may simply observe an operation that it determines to be "anomalous" or other suspicious. In this example, the DPS 500 is positioned intermediate a database client 502, and a database server 504 (corresponding generally to the configuration shown in FIG. 3). As has been described, the DPS typically operates by intercepting the traffic between the endpoints, namely, database queries from the client, and database responses from the server. The DPS 500 maintain a set of security rules (one or more security policies) defining how to handle each security situation. An example security rule includes suspending the database application and releasing the database server resources for application connection where access to one or more database objects is not authorized by the security rules. The DPS 500 may correspond to the agent and EDSM components in FIG. 4, or it may be operated or configured as a separate computing system. It is not required to have knowledge or logic to assemble database protocol structures.

As depicted, the database client 500 issues a request, in this case one that (when intercepted and evaluated by the DPS) will not trigger a security violation determination. The DPS 500 thus allows the request to pass through to the database server 504 over the connection depicted. The database server 504 returns a response, and that response is then passed through the DPS and returned to the database client 502 over the connection, which is then closed.

As previously described, the DPS mechanism 500 includes logic to terminate the database connection, however, when a security anomaly/violation is identified. Shutting down the connection, however, causes an abnormal event (an exception) on the client side, and the database client 502 tries to handle this event by attempting to restore the security-violating connection. This creates communications and processing inefficiencies. This problem is addressed and solved by the subject matter of this disclosure, which is now described.

Suspending Security-Violating Database Client Connections

According to this disclosure, a database access control system such as described includes additional functionality to enable efficient management and handling of security-violating database client connections. To this end, when the DPS determines to suspend a suspect database client connection (e.g., because a security anomaly or violation has been identified), preferably several actions are taken. First, the DPS drops the request and sends a database protocol-specific message (e.g., a "close" message) to the database server; upon receiving an acknowledgment, the DPS closes the associated transport layer connection mechanism (e.g., the database server socket). The DPS then initiates an interaction with the database client and, in particular, the exchange of periodic messages (e.g., keep-alive messages) that are configured to maintain the database client in what is in effect a suspended state. While in this operating state, the database client does not detect any problem with the application or the connection and thus does not try to reconnect to the database server. The DPS then performs an additional assessment/investigation of the security violation even as the connection remains open, but suspended. Further action is then taken depending on the results of this evaluation.

Figures 6, 7:
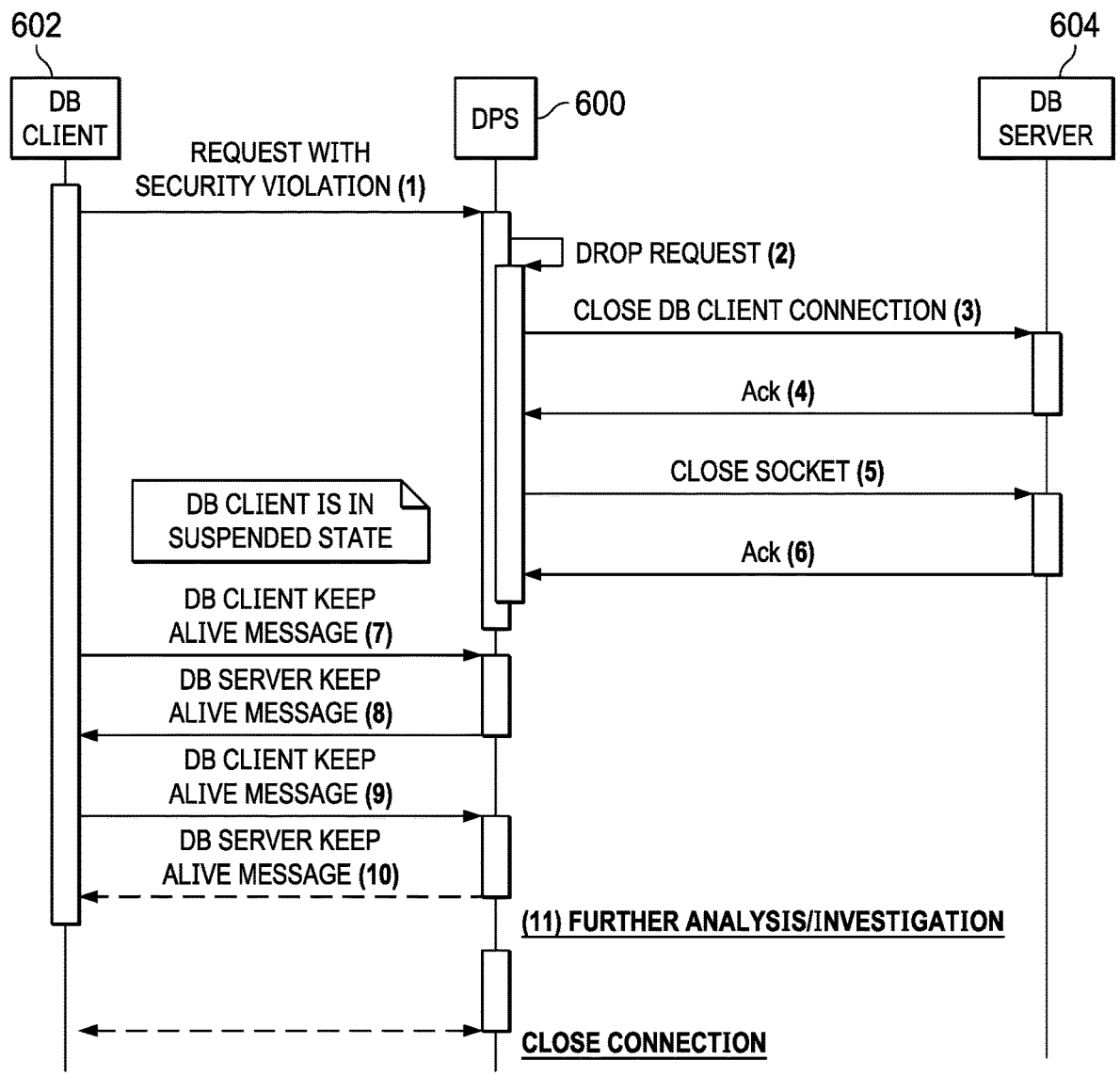
FIG. 6 depicts the processing of a client request by a database protection solution/system that has been augmented according to the technique of this disclosure.
FIG. 7 depicts an application layer request that includes a keep-alive message.

FIG. 6 depicts the above-described operation. In this example, DPS 600 has been augmented to include the above-described functionality. The process begins at step (1) with the database client 602 making a request over the connection; in contrast to the scenario depicted in FIG. 5, the request here is one that, upon evaluation by DPS 600, will generate a security violation. Thus, and as depicted, upon determining that the request is suspect, the DPS 600 drops the request at step (2). At step (3), the DPS 600 issues a message to the database server 604, e.g., to close the connection. The nature and semantics of the message depends on the database protocol and thus is protocol-specific. In a representative scenario, the message is a "close" message. The database server 604 responds at step (4) with an acknowledgement and, in response at step (5), DPS 600 closes the socket, which had previously been opened between the DPS 600 and the database server 604. While step (5) is shown as closing the socket, other actions that may be taken could include detaching a shared memory segment, or the like. In this example, the database server 604 then responds at step (6) with another acknowledgment. This terminates the DPS-database server interaction with respect to the request, and it releases resources (on the database server) that were otherwise attached to the client connection.

According to this disclosure, the following additional operations are then initiated by the DPS. In particular, the DPS executes a particular message exchange with the database client 502 to maintain the database client in a suspended state with respect to the original request. As shown, typically the database client 602 already sends a keep-alive message to the DPS. This is shown as step (7). In the usual case, i.e., without the technique of this disclosure, the DPS 600 would respond to the client 602 with a communication error (an exception) given that the DPS has already dropped the request and closed the back-end DPS-to-database server connection. In lieu of that operation, however, the DPS 600 instead is configured to respond to the database client with its own keep-alive message. This is step (8). The database client and DPS then continue with a message exchange, typically involving a series of keep-alive messages. In particular, when the client sends another keep-alive message at step (9), the DPS again responds with a keep-alive message at step (10), and this message exchange then continues. In this manner, and in particular by using the message exchange (following the DPS's dropping of the original request and closing of the server connection), the database client 602 is maintained by the DPS 600 in a suspended (or "hanging") state. While the security-violating database client is in this hanging state, at step (11) the DPS preferably then undertakes a further security analysis or investigation as may be needed to further characterize or identify the security violation. Step (11) is optional. When implemented, this additional processing (analysis, investigation, etc.) may be performed by the DPS natively, or the DPS may leverage other systems, devices, applications, processes, data structures, and the like. The nature of any follow-on evaluation by the DPS while the client is hung is not a limitation of this disclosure.

With respect to a security violating-suspended connection, various types of information (e.g., OS session information such as remote client process ID and remote OS caller process ID, remote terminal ID, physical path to client program, client program memory snapshot, etc.) can be collected if the connection remains alive. Thus, for example, if a malicious user using several programs has opened several connections from the same physical host but only one of which is security-violating (and thus suspended), the DPS (or another entity on its behalf) can collect and analyze remote client OS information on the alive connection, thereby enabling the DPS to isolate any other connections belonging to the malicious user.

Thus, according to this disclosure, upon determination by the DPS that the request is suspicious (or otherwise actually violates some applicable security rule), the request is dropped and the database server connection closed; the database client, however, is placed in a hanging state (by the on-going message exchange), thereby preventing the database client from attempting to try to reconnect. In this manner, the security-violating connection itself (between the client and DPS) is suspended. Upon completion of its follow-on evaluation (if any), the DPS 600 then takes an action. The action is implementation-specific, e.g., restricting the client from further access to the server, sandboxing additional requests initiated by the client, logging the request (and any result of the follow-on analysis), issuing a notification or alert, and so forth. Typically, the action includes closing of the connection over which the keep-alive message exchange is being carried out. This ends the processing.

In a variant scenario, it may not be necessary to terminate the client connection as, once suspended, the malicious client typically has to take some action to attempt access again; in this scenario, the connection may thus be terminated from the client-side.

The keep-alive message exchange as described above may be implemented on the application level, or the transport level. Some database protocols do not have their own native keep-alive mechanism and, in such case, are configured instead to rely on TCP-based keep-alive messaging. An example of such a database protocol is Microsoft® SQL Server TDS. Other database protocols, such as Oracle® TNS, allow for imitation of keep-alive messages, e.g., using a "re-send" message (e.g., "00 08 00 00 0b 00 00 00," namely, blank information with just the supporting message code 0x0b). Generalizing, the message exchange between the database client and the DPS that maintains the client in a suspended state thus may vary and may be provided at the application- or transport-level depending on the database protocol implementation. Thus, the technique of this disclosure is implemented using a keep-alive mechanism irrespective of the OSI layer or request-response messaging semantics. In a still further example, FIG. 7 depicts the use of Layer 7 (e.g., an HTTP 1.1 response) over a persistent connection that includes a Keep-Alive attribute and setting (e.g., timeout=5, max=1000). The exchange of keep-alive messages typically is not burdensome to the DPS. For example, TCP keep-alive messages typically are sent periodically, e.g., once per minute. Application-based keep-alive messages typically have a period measured in seconds.

In a representative attack scenario, assume that an entity (operating the database client) creates several valid user accounts. The entity connects to the database server and sends a security-violating query using a first valid account. The DPS, overseeing the interaction, detects the security violation and the performs the operations described above, namely, dropping the request, closing the connection to the database server and initiating the keep-alive message exchange. The DPS may also disable the first (offending) user account. If the entity thereafter uses a second user account and sends another security-violating query, the DPS may then determine that the entire session is security-violating, in which case the DPS preferably suspends (hangs) all subsequent requests for the security-violating session. By initiating the keep-alive message-exchange for one or more of the request(s) (or the account(s)), the DPS is able to collect additional information; indeed, even if the entity itself is enabled to investigate the connection suspension, this operation itself becomes visible to the DPS, and the DPS can react/respond accordingly depending on configuration/policy.

In an alternative operating scenario, the DPS is monitoring an opened multiplexed connection with several channels, and a request from one channel is determined to violate an applicable security policy. In this scenario, the DPS may not be in a position to close the overall connection because, in so doing, all channels might be affected. In this scenario, the DPS is configured in the manner described to hang a specific channel while continuing to investigate the problem while remaining in runtime operation (with respect to the remaining channels). In this context, the "client connection" thus is specific to a channel.

The subject matter herein provides numerous advantages. The approach is simple to implement, as all that is required is that the DPS be configured to drop the request, sever the server connection, and initiate a keep-alive message exchange to keep the client in a hung state while follow-on evaluation is carried out (if needed). The technique prevents the database client from responding to the suspended connection by attempting to try to reconnect, and it enables any impacted server resources to be otherwise released and thus available to service other legitimate requests (from other clients). This approach thus provides for an improved database access control system that provides consistent security check validations on database queries, e.g., those passed via the intercepting agent. The approach is scalable, and it assures that DPS can operate efficiently at all times irrespective of load(s) presented by the request and response traffic flows. The approach increases the overall accuracy and throughput of the system significantly, all without requiring additional database server host resources.

Generalizing, the enhanced DPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud. A representation commercial DPS in which the described technique may be implemented is IBM® Guardium® DPS, but this is not a limitation.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the DPS, or the agent and EDSM components, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the DPS (or agent/EDSM) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

The techniques herein provide for improvements to another technology or technical field, namely, database access control systems, as well as improvements to the operational capabilities of such systems when used in the manner described.

While the technique as described preferably leverages a keep-alive mechanism for the purposes of maintaining the client in a hanging/suspended state, the DPS and the database client may be configured to use another request-response mechanism dedicated for this purpose.

Having described our invention, what we claim is as follows.

The invention claimed is:

1. A method operative in a database protection system wherein database requests directed from a client to a database server are monitored to identify suspicious behavior, comprising:
   detecting that a request directed from the client to the database server over a client connection includes a security violation;
   responsive to the detecting, and while the client connection remains intact, dropping the request and causing database server resources associated with the client connection to be released;
   executing a message exchange with the client over the client connection, thereby maintaining the client in a suspended state with respect to the request and inhibiting the client from attempting to reconnect to the database server; and
   while the database client remains in the suspended state, taking a given action.

2. The method as described in claim 1 wherein the message exchange comprises receiving a keep-alive message at the database protection system from the database client and, in response, sending a keep-alive message from the database protection system to the database client.

3. The method as described in claim 2 wherein the keep-alive messages are received and sent at one of: an application layer, and a transport layer.

4. The method as described in claim 2 wherein the keep-alive messages are configured using an alternative message associated with a database protocol utilized by the database server.

5. The method as described in claim 1 wherein the given action includes further analyzing the security violation.

6. The method as described in claim 1 further including terminating the client connection.

7. The method as described in claim 1 wherein the database server resources are released by one of: closing a socket associated with the client connection, and detaching a shared memory segment associated with the client connection.

8. Apparatus for use in a database protection system wherein database requests directed from a client to a database server are monitored to identify suspicious behavior, comprising:
   a processor;
   computer memory holding computer program instructions executed by the processor, the computer program instructions comprising program code configured to:
      detect that a request directed from the client to the database server over a client connection includes a security violation;
      responsive to the detecting, and while the client connection remains intact, drop the request and cause database server resources associated with the client connection to be released;
      execute a message exchange with the client over the client connection, thereby maintaining the client in a suspended state with respect to the request and inhibiting the client from attempting to reconnect to the database server; and
      while the database client remains in the suspended state, take a given action.

9. The apparatus as described in claim 8 wherein program code configured to exchange the message exchange comprises program code configured to receive a keep-alive message at the database protection system from the database client and, in response, to send a keep-alive message from the database protection system to the database client.

10. The apparatus as described in claim 9 wherein the keep-alive messages are received and sent at one of: an application layer, and a transport layer.

11. The apparatus as described in claim 9 wherein the keep-alive messages are configured using an alternative message associated with a database protocol utilized by the database server.

12. The apparatus as described in claim 8 wherein the program code configured to take the given action includes program code configured to further analyze the security violation.

13. The apparatus as described in claim 8 further including program code configured to terminate the client connection.

14. The apparatus as described in claim 8 wherein the database server resources are released by executing program code that causes closing of a socket associated with the client connection, or by executing program code that causes the database server to detach a shared memory segment associated with the client connection.

15. A computer program product in a non-transitory computer readable medium, the computer program product holding computer program instructions executed by a processor in association with a database protection system wherein database requests directed by a client to a database server are monitored to identify suspicious behavior, the computer program instructions comprising program code configured to:
   detect that a request directed from the client to the database server over a client connection includes a security violation;
   responsive to the detecting, and while the client connection remains intact, drop the request and cause database server resources associated with the client connection to be released;
   execute a message exchange with the client over the client connection, thereby maintaining the client in a suspended state with respect to the request and inhibiting the client from attempting to reconnect to the database server; and
   while the database client remains in the suspended state, take a given action.

16. The computer program product as described in claim 15 wherein program code configured to exchange the message exchange comprises program code configured to receive a keep-alive message at the database protection system from the database client and, in response, to send a keep-alive message from the database protection system to the database client.

17. The computer program product as described in claim 16 wherein the keep-alive messages are received and sent at one of: an application layer, and a transport layer.

18. The computer program product as described in claim 16 wherein the keep-alive messages are configured using an alternative message associated with a database protocol utilized by the database server.

19. The computer program product as described in claim 15 wherein the program code configured to take the given action includes program code configured to further analyze the security violation.

20. The computer program product as described in claim 15 further including program code configured to terminate the client connection.

21. The computer program product as described in claim 15 wherein the database server resources are released by executing program code that causes closing of a socket associated with the client connection, or by executing program code that causes the database server to detach a shared memory segment associated with the client connection.

* * * * *